(12) United States Patent  (10) Patent No.: US 7,955,743 B2
Ganapathy et al.  (45) Date of Patent: Jun. 7, 2011

(54) ADAPTIVE GAIN SCHEDULED CONTROL FOR CURRENT LIMITATION BASED ON VOLTAGE PERFORMANCE OF A FUEL CELL SYSTEM

(75) Inventors: Sriram Ganapathy, Rochester, NY (US); David A. Arthur, Honeoye Falls, NY (US); Manish Sinha, Pittsford, NY (US); John P. Salvador, Penfield, NY (US); David R. Savage, Rochester, NY (US); Frank X. Leo, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 661 days.

(21) Appl. No.: 12/027,049

(22) Filed: Feb. 6, 2008

(65) Prior Publication Data

US 2009/0197126 A1  Aug. 6, 2009

(51) Int. Cl.
*H01M 8/04* (2006.01)
(52) U.S. Cl. .................. 429/428; 429/431; 429/432
(58) Field of Classification Search .................. 429/428, 429/431, 432
See application file for complete search history.

(56) References Cited

U.S. PATENT DOCUMENTS 5,156,928 A * 10/1992 Takabayashi ................. 429/431
7,419,734 B2 * 9/2008 Pearson ........................ 429/431

* cited by examiner

*Primary Examiner* — Patrick Ryan
*Assistant Examiner* — Julian Mercado
(74) *Attorney, Agent, or Firm* — John A. Miller; Miller IP Group, PLC

(57) ABSTRACT

A system and method for limiting the output current of a fuel cell stack as the stack degrades overtime. A look-up table identifies a predetermined voltage set-point for stack current density. A first comparator provides a voltage difference signal between the set-point and the stack voltage. The voltage difference signal is provided to a controller, such as a proportional-integral controller, that provides a current limiting signal. The current limiting signal and a current request signal are provided to a second comparator that selects which signal will be used to limit the maximum output current of the stack. A polarization curve estimator estimates parameters of the stack that will change over the life of the stack. The parameters are provided to a gain scheduler that provides gains to the controller that are based on where in the life of the stack it is currently operating.

22 Claims, 2 Drawing Sheets

US 7,955,743 B2

ADAPTIVE GAIN SCHEDULED CONTROL FOR CURRENT LIMITATION BASED ON VOLTAGE PERFORMANCE OF A FUEL CELL SYSTEM

BACKGROUND OF THE INVENTION

1. Field of the Invention

This invention relates generally to an algorithm for limiting the output current from a fuel cell stack and, more particularly, to an algorithm for limiting the output current from a fuel cell stack based on various parameters, such as stack performance, stack life, etc.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The stack controller needs to know the current/voltage relationship, referred to as a polarization curve, of the fuel cell stack to provide a proper distribution of power from the stack. The relationship between the voltage and the current of the stack is typically difficult to define because it is non-linear, and changes depending on many variables, including stack temperature, stack partial pressures and cathode and anode stoichiometries. Additionally the relationship between the stack current and voltage changes as the stack degrades over time. Particularly, an older stack will have lower cell voltages, and will need to provide more current to meet the power demands than a new, non-degraded stack.

Fortunately, many fuel cell systems, once they are above a certain temperature, tend to have repeatable operating conditions at a given current density. In those instances, the voltage can be approximately described as a function of stack current density and age.

SUMMARY OF THE INVENTION

In accordance with the teachings of the present invention, a system and method are disclosed for limiting the output current of a fuel cell stack as the stack degrades and its performance decreases over time. The fuel cell stack provides a voltage output signal and a current density output signal, where the current density output signal is provided to a lookup table that identifies a predetermined voltage set-point for the particular current density. The voltage set-point is sent to a first comparator that compares it to the voltage output signal from the stack to generate a voltage difference signal. The voltage difference signal is provided to a controller, such as a proportional-integral controller, that provides a current limiting signal based on the voltage difference signal. The current limiting signal and a current request signal are provided to a second comparator that selects the lesser of the two, which is used to limit the maximum output current of the stack. The output voltage signal and the output current signal from the stack are also provided to a polarization curve estimator that estimates parameters of the stack to define a polarization curve of the stack that will change over the life of the stack. The parameters from the estimator are provided to a gain scheduler that provides gains to the controller that are based on where in the life of the stack it is currently operating.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for limiting fuel cell stack output current as the stack degrades over time is merely exemplary in nature, and is in no way intended to limit the invention or its applications or uses.

The present invention proposes an algorithm for limiting the output current from a fuel cell stack based on stack performance, such as voltage degradation, or other external factors, such as the anode inlet pressure being too low. One purpose of the limitation algorithm is to maintain the fuel cell system in operation even if the stack cannot provide full performance and to be able to draw enough current from the stack to run the vehicle or charge the battery. As will be discussed in detail below, the algorithm is designed to limit the current output from the stack based on stack voltage performance.

Figure 1:
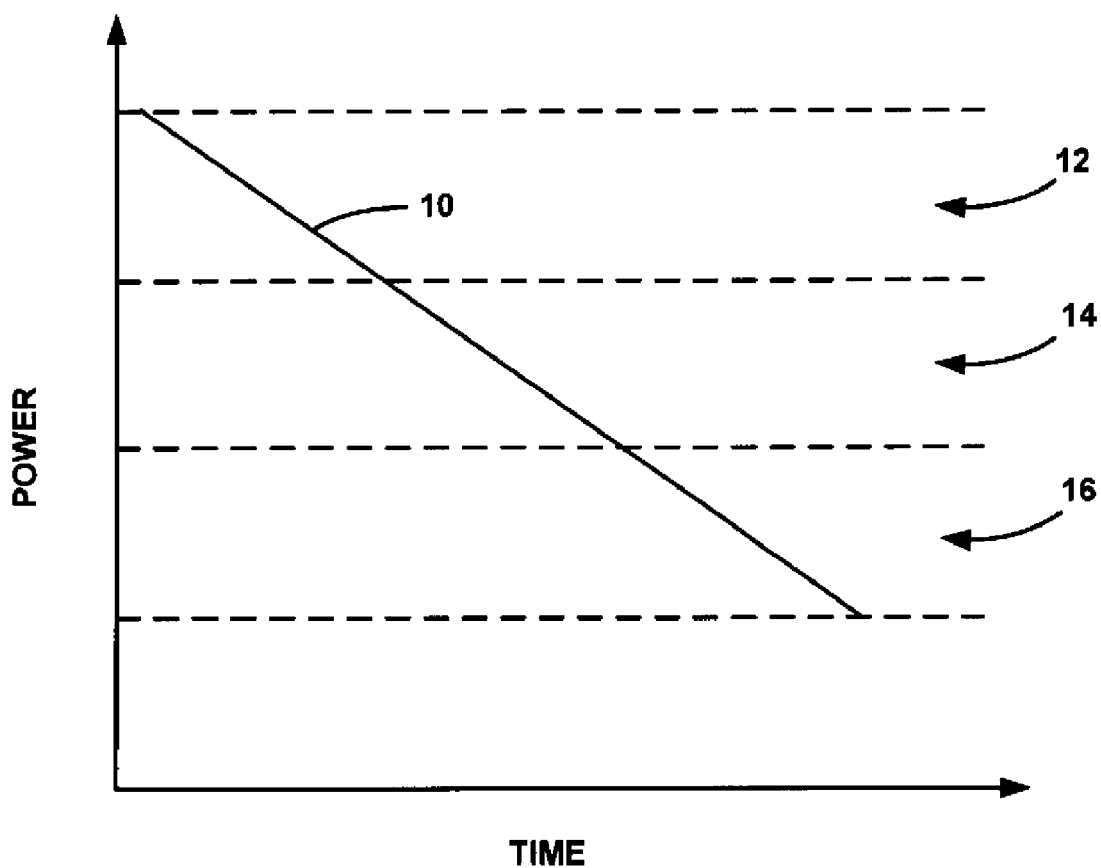
FIG. 1 is a graph with time on the horizontal axis and power on the vertical axis showing a maximum output power from a fuel cell stack as the stack degrades over time.

FIG. 1 is a graph with time on the horizontal axis and power on the vertical axis to show how the output power of a fuel cell stack typically degrades over time. The graph is separated into three sections, particularly a beginning of stack life section 12, a middle of stack life section 14 and an end of stack life section 16 over the life of the fuel cell stack. Graph line 10 shows how the output power of the stack is reduced over time as a result of stack degradation. Although the graph line 10 is linear, the actual degradation of the fuel cell stack may be better represented by a curve.

Figure 2:
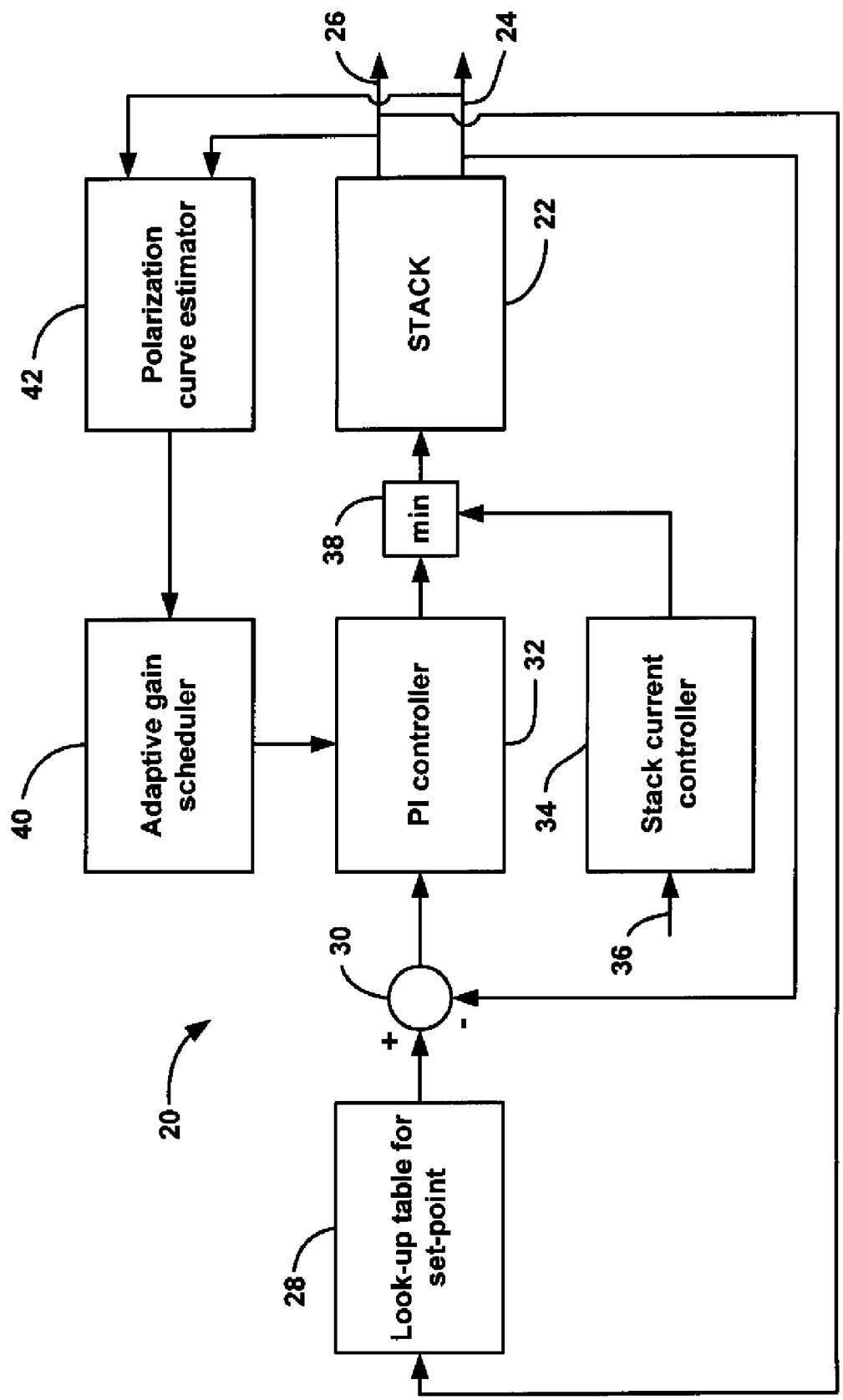
FIG. 2 is a block diagram of a fuel cell system that employs a process for limiting stack output power based on stack performance, according to an embodiment of the present invention.

FIG. 2 is a block diagram of a fuel cell system 20 that uses an algorithm for limiting the output current of a fuel cell stack

22 based on stack performance over time, according to an embodiment of the present invention. A stack output voltage signal V is provided on line 24 from the stack 22 and a stack output current density signal j is provided on line 26 from the stack 22. The stack output current signal j is provided to a look-up table 28 that identifies a voltage set-point $V_{sp}$ for the current density of the stack 22. The voltage set-point $V_{sp}$ values stored in the look-up table 28 are predetermined values that are selected for the stack performance requirements discussed herein. In one embodiment, the voltage set-point $V_{sp}$ is higher at lower current densities and lower at higher current densities for increased flexibility and improved response. The voltage set-point $V_{sp}$ from the look-up table 28 is sent to a comparator 30 along with the voltage output signal V from the stack 22 to generate a voltage difference signal as the difference therebetween.

The voltage difference signal is sent to a controller 32 that controls the current output of the stack 22 to limit the output power as the stack 22 ages. In one non-limiting embodiment, the controller 32 is a proportional-integral (PI) controller. However, as will be appreciated by those skilled in the art, other types of controllers, such as PID, PD, LQR, etc. controllers, can also be employed within the scope of the present invention. The stack current control by the controller 32 is activated when the voltage output signal V from the stack 22 is less than the voltage set-point $V_{sp}$. In this situation, the controller 32 tries to maintain the stack voltage V at the set-point $V_{sp}$ by reducing the current provided by the stack 22. Thus, the controller 32 tries to keep the stack voltage V at the set-point $V_{sp}$ only if the voltage V is below the set-point $V_{sp}$. If the voltage V is above the set-point $V_{sp}$ then the controller 32 does not need to act.

The proportional part of the controller 32 is designed so that it is active only when the voltage difference signal is negative. The proportional gains for the PI controller 32 are scheduled based on the voltage set-point $V_{sp}$ and the life of the stack 22. The integral part of the PI controller 32 is designed so that the controller 32 is enabled/disabled with stall and reset controls on the integrator. The stall control is enabled only if the voltage difference signal is less than a certain threshold, such as 10 volts. The controller output is reset by the reset control if the voltage difference signal goes below another threshold, such as 70 volts. The values of the stall and reset thresholds are selected so that the reset threshold is higher than the stall threshold to allow the integrator to have some memory of the performance of the stack 22 so that if an immediate transient causes the stack voltage V to drop below the voltage set-point $V_{sp}$, the controller 32 responds faster. The integrator gains are scheduled based on the voltage set-point $V_{sp}$ and the life of the stack 22.

The output of the controller 32 is a current limit value $I_{Lim}$ that limits the current density output of the stack 22. When a request for power $P_{req}$ is made to a stack current controller 34 on line 36, the controller 34 converts the power request signal $P_{req}$ to a current request signal $I_{req}$. The current request $I_{req}$ is sent to a comparator 38 that compares the current request signal $I_{req}$ to the current limit value $I_{lim}$, and outputs the lesser of the two to the stack 22 so that the current density output of the stack 22 is limited based on the voltage set-point $V_{sp}$ or is limited based on the current request signal $I_{req}$.

The gains $K_p$ and $K_I$ of the PI controller 32 are set by an adaptive gain scheduler 40. The gains $K_p$ and $K_j$ are adapted based on a polarization curve estimation algorithm provided by a polarization curve estimator 42. The estimator 42 receives the voltage output signal V and the current density output signal j from the stack 22 and generates estimates of the stack parameters. As the stack 22 degrades with life, the parameters vary, which reduces the maximum power available from the stack 22. In this non-limiting example, each of the sections 10, 12 and 14 in the graph shown in FIG. 1 has a particular gain $K_p$ and $K_i$ associated therewith. Therefore, when the adaptive gain scheduler 40 determines that the stack 22 has entered a new section as it ages, the polarization curve parameters are used to change the gain for the particular section.

Many control parameters of a fuel cell system require knowledge of the polarization curve of the fuel cell stack, such as knowing the maximum voltage potential and current draw available from the fuel cell stack. As mentioned above, as the stack ages, the stack polarization curve also changes as a result of stack degradation. U.S. patent application Ser. No. 11/669,898, filed Jan. 31, 2007, titled Algorithm for Online Adaptive Polarization Curve Estimation of a Fuel Cell Stack, assigned to the Assignee of this Application and herein incorporated by reference, discloses an algorithm for calculating the polarization curve of a fuel cell stack online as the fuel cell system is being operated. The algorithm of the '898 application estimates two or more stack parameters from collected data as the stack is being operated, and uses the parameters to calculate the polarization curve. When the fuel cell stack is running and certain data validity criteria have been met, the algorithm goes into a good collection mode where it collects stack data, such as stack current density, average cell voltage and minimum cell voltage. When the stack is shut down, the algorithm uses a cell voltage model to solve a non-linear least squares problem to estimate predetermined parameters that define the polarization curve. If the estimating parameters satisfy certain termination criteria, then the estimated parameters are stored to be used by a system controller to calculate the polarization curve of the stack for future stack runs. The polarization curve estimator 42 can use the polarization curve estimation process in the '898 application, or any other suitable algorithm.

In one non-limiting embodiment, the controller gains are modified so that they respond faster and harsher at the end of life section 14 than in the beginning of life section 10 to avoid system shut-downs due to low stack voltage at the expense of oscillations. During the beginning of life of the stack 22, the controller gains are relaxed to allow the stack 22 to recover normally during transients and to avoid any unnecessary limitations and oscillations.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a fuel cell stack providing an output voltage signal and an output current signal;
   a conversion table for converting the output current signal from the stack to a voltage set-point signal;
   a first comparator responsive to the voltage set-point signal and the voltage output signal from the fuel cell stack, and providing a voltage difference signal therebetween;
   a current limiting controller responsive to the voltage difference signal and a control signal, said current limiting controller providing a current limiting signal; and
   a second comparator responsive to the current limiting signal and a current request signal, said second comparator selecting the lesser of the current limiting signal and the current request signal and providing the lesser current signal to the fuel cell stack as a maximum current signal that defines the maximum current available from the stack.

2. The system according to claim 1 further comprising a polarization curve estimator responsive to the output voltage signal and the output current signal from the fuel cell stack, said polarization curve estimator providing system parameters that set the control signal for the controller.

3. The system according to claim 2 wherein the current limiting controller is a proportional-integral controller and the control signal includes a proportional gain and an integral gain.

4. The system according to claim 3 wherein the proportional and integral gains are set based on which region of life the stack is currently operating.

5. The system according to claim 3 wherein the proportional-integral controller has a proportional part that is active only when the voltage difference signal is negative.

6. The system according to claim 3 wherein the proportional-integral controller has an integral part that is enabled and disabled with stall and reset controls, where the stall control is enabled only if the voltage difference signal is less than a predetermined threshold and the reset control resets the controller if the voltage difference signal is less than a second threshold.

7. The system according to claim 6 wherein the first threshold is less than the second threshold.

8. The system according to claim 1 further comprising a stack current controller responsive to a stack power request signal, said stack current controller providing the current request signal.

9. The system according to claim 1 wherein the voltage set-point signal decreases as the current density output signal increases.

10. A fuel cell system comprising:
a fuel cell stack providing an output voltage signal and an output current signal;
a conversion table for converting the output current signal from the stack to a voltage set-point signal;
a first comparator responsive to the voltage set-point signal and the voltage output signal from the fuel cell stack, and providing a voltage difference signal therebetween;
a proportional-integral controller responsive to the voltage difference signal and having proportional and integral adaptive gains that can be set, said proportional-integral controller providing a current limiting signal;
a polarization curve estimator responsive to the output voltage signal and the output current signal from the fuel cell stack, said polarization curve estimator providing system parameters that define the proportional gain and the integral gain;
a stack current controller responsive to a stack power request signal, said stack current controller providing a current request signal; and
a second comparator responsive to the current limiting signal and the current request signal, said second comparator selecting the lesser of the current limiting signal and the current request signal and providing the lesser current signal to the fuel cell stack as a maximum current signal that defines the maximum current available from the stack.

11. The system according to claim 10 wherein the proportional and integral adaptive gains are set based on which region of life the stack is currently operating.

12. The system according to claim 10 wherein the proportional-integral controller has a proportional part that is active only when the voltage difference signal is negative.

13. The system according to claim 10 wherein the proportional-integral controller has an integral part that is enabled and disabled with stall and reset controls, where the stall control is enabled only if the voltage difference signal is less than a first threshold and the reset control resets the controller if the voltage difference signal is less than a second threshold.

14. The system according to claim 13 wherein the first threshold is less than the second threshold.

15. The system according to claim 10 wherein the voltage set-point signal decreases as the output current signal increases.

16. A method for limiting an output current from a fuel cell stack, said method comprising:
converting an output current signal from the fuel cell stack to a voltage set-point signal;
providing a voltage difference signal between the voltage set-point signal and an output voltage signal from the fuel cell stack;
providing a current limiting signal based on the voltage difference signal and a control signal;
selecting the lesser of the current limiting signal and a current request signal; and
providing the lesser current signal to the fuel cell stack as a maximum current signal that defines the maximum current available from the stack.

17. The method according to claim 16 further comprising estimating system parameters based on a polarization curve calculated from the stack output voltage signal and the stack output current signal that set the control signal for the controller.

18. The method according to claim 17 wherein providing a current limiting signal includes using a proportional-integral controller and wherein the control signal includes a proportional gain and an integral gain.

19. The method according to claim 18 wherein the proportional and integral gains are set based on which region of life the stack is currently operating.

20. The method according to claim 18 wherein the proportional part of the proportional-integral controller is active only when the voltage difference signal is negative.

21. The method according to claim 18 wherein the integral part of the proportional-integral controller is enabled and disabled with stall and reset controls, where the stall control is enabled only if the voltage difference signal is less than a predetermined threshold and the reset control resets the controller if the voltage difference signal is less than a second threshold.

22. The method according to claim 16 wherein the voltage set-point signal decreases as the current density output signal increases.

* * * * *